Sept. 28, 1954  B. R. BABBITT ET AL  2,690,431
METHOD OF CARBONATING AMMONIACAL SOLUTIONS
Filed Jan. 11, 1952  2 Sheets-Sheet 2
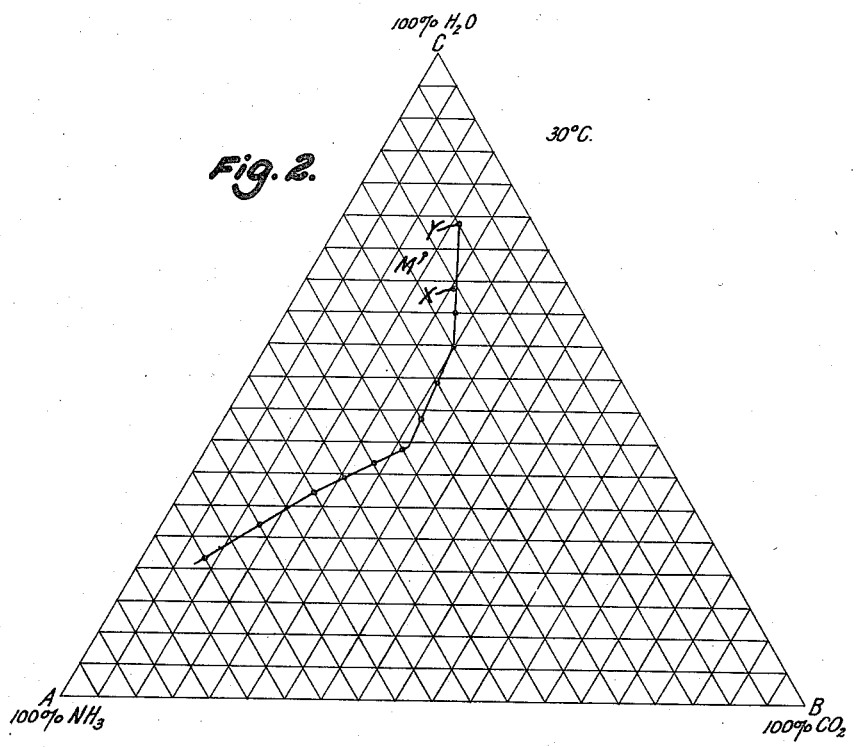
Inventors:
Bernard R. Babbitt and
Charles B. Kung,
Pierce, Scheffler & Parker
Their Attorneys.

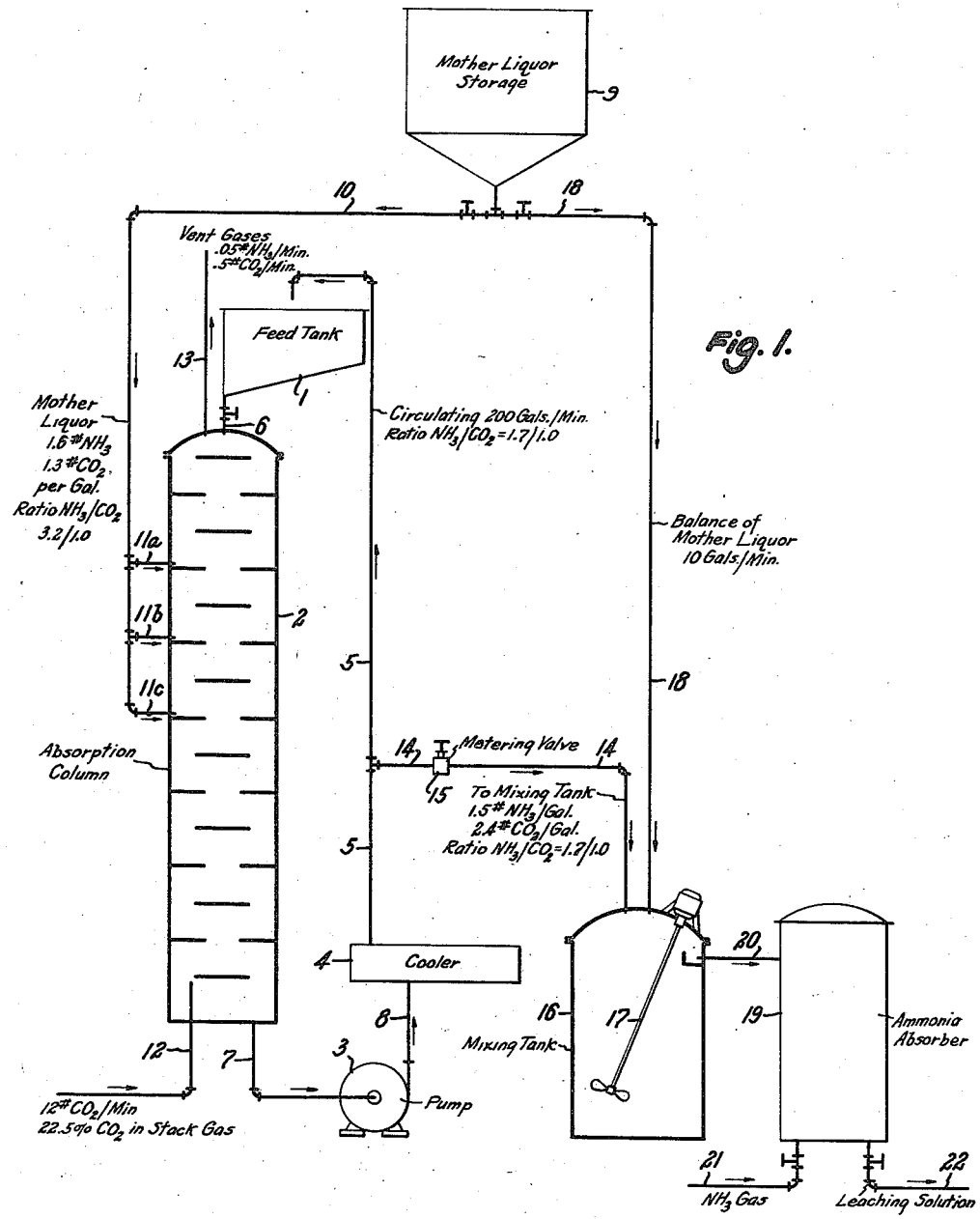

Patented Sept. 28, 1954

2,690,431

UNITED STATES PATENT OFFICE 2,690,431

METHOD OF CARBONATING AMMONIACAL SOLUTIONS

Bernard R. Babbitt and Charles B. Kunz, Minneapolis, Minn., assignors to Manganese Chemicals Corporation, Minneapolis, Minn., a corporation of Minnesota Application January 11, 1952, Serial No. 266,026

12 Claims. (Cl. 252—182)

This invention relates to the provision of a strongly ammoniacal solution of ammonium carbamate adapted for use as a leaching solution in the recovery of a metal from its ore, and is particularly concerned with a method of producing such leaching solution from an aqueous mother liquor, containing $NH_3$ and $CO_2$, by carbonation and subsequent ammoniation.

In its preferred embodiment the invention consists in a method of converting an aqueous liquor containing approximately 1.6 pounds/gal. (11.2 mols/liter) of $NH_3$ and approximately 1.3 pounds/gal. (3.5 mols/liter) of $CO_2$ into an aqueous leaching solution which is a strongly ammoniacal solution of ammonium carbamate, i. e., a solution containing enhanced concentrations of $NH_3$ and $CO_2$, e. g., up to 18 or more mols/liter of $NH_3$ and up to 5 or more mols/liter of $CO_2$.

In essence the present invention is concerned with the utilization of a lean gas containing $CO_2$ in substantial but minor amount, e. g., a stack gas containing 20% $CO_2$, more or less, as the source of $CO_2$ in the carbonation of an aqueous solution containing $NH_3$ and $CO_2$ in such relative amounts that $NH_4OH$ as such exists therein, e. g., in the carbonation of a mother liquor containing, say, approximately 11.2 mols/liter of $NH_3$ and approximately 3.5 mols/liter of $CO_2$.

It heretofore had been proposed to carbonate aqueous solutions containing $NH_3$ and $CO_2$ in such relative amounts that $NH_4OH$ as such existed therein—which solutions will, in the following, be called "mother liquors" in the interest of brevity—by directly contacting such mother liquors with a stack gas or other industrial by-product gas containing a substantial but minor amount of $CO_2$. However, it was found that the vapor pressure of the ammonia contained in the mother liquors was so high that the relatively large amount of ammonia carried off by the $CO_2$-denuded stack gas made this direct mode of carbonation industrially unfeasible (that is to say, economically impossible). Thus, if a stack gas containing approximately 20% $CO_2$ is passed through a mother liquor containing about 1.6 lbs. $NH_3$/gal. and about 1.3 lbs. $CO_2$/gal.—mol ratio of $NH_3$ to $CO_2$ approximately 3.2 to 1— the $CO_2$ will be absorbed but a very considerable amount of $NH_3$ will be lost with the inert gases. Following is a table showing the loss of $NH_3$ for various ratios of $NH_3$ to $CO_2$ and for various concentrations of $NH_3$ and $CO_2$:

| Ratio $NH_3/CO_2$ in mols | Gm. Mols $NH_3$/l. | Gm. Mols $CO_2$/l. | Lbs. of $NH_3$ lost per 100 cu. ft. of inert gas |
|---|---|---|---|
| 3.86/1 | 14.5 | 3.76 | 2.25 |
| 2.44/1 | 12.2 | 5.00 | .31 |
| 2.16/1 | 11.3 | 5.22 | .20 |
| 1.78/1 | 10.0 | 5.62 | .16 |
| 1.54/1 | 5.07 | 3.28 | .02 |

The $NH_3$ losses drop off with the decrease in $NH_3$ to $CO_2$ ratio and with the decrease in $NH_3$ concentration.

It has now been found that such mother liquors may advantageously and economically be carbonated with $CO_2$ from stack gases, without, however, suffering any substantial losses of their ammonia contents, by the following indirect method: An aqueous solution consisting essentially of ammonia and carbon dioxide in the approximate mol ratio of 1.7 to 1 is caused to circulate in a closed circuit, and into this circulating liquor there is introduced, preferably portion by portion, the mother liquor in such relatively small amounts, with respect to the volume of circulating liquor, that the ammonia content of the mother liquor so introduced is never substantially greater than is the ammonium acid carbonate content of the circulating liquor. Simultaneously, the circulating liquor is contacted with the stack gas (or other gas consisting essentially of $CO_2$) in such manner as to effect the absorption of $CO_2$ and the conversion of a portion of the ammonium carbonate content to ammonium acid carbonate. Coincidental with addition of mother liquor, like amounts of the resulting circulated liquor are withdrawn from the closed circuit to maintain the volume of the latter substantially constant. The withdrawn liquor, containing $NH_3$ and $CO_2$ in the approximate mol ratio of 1.7 to 1, is admixed with a further portion of the mother liquor, preferably in such relative amounts as to yield an aqueous solution of ammonium carbamate, and the resulting admixture is contacted with $NH_3$ gas for suitable enhancement of its $NH_3$ content to yield a leaching liquor containing up to 18 or more mols/liter of $NH_3$ and up to 5 or more mols/liter of $CO_2$.

The invention will now be described in greater particularity and with reference to the accompanying drawing, in which:

Fig. 1 is a diagrammatic representation of an apparatus suitable for use in carrying out the invention, and Fig. 2 is a triangular diagram on which the ammonia, water and carbon dioxide system is ploted in weight percent for 30° C.

In Fig. 1, feed tank 1, absorption column 2, pump 3, and cooler 4 are arranged in a closed circuit system, by way of conduits 5, 6, 7 and 8, for maintaining circulation through absorption column 2 of a body of aqueous "circulating liquor," the same consisting essentially of water, ammonia and carbon dioxide, these latter in the approximate mol ratio of 1.7 to 1. In the specific installation now being described this body of aqueous circulating liquor amounts to about 200 gallons per minute. Absorption column 2 is a standard baffled type column through which a slurry of crystals—if crystals are formed in the circulating liquor—can be moved.

Mother liquor, viz., an aqueous solution consisting essentially of ammonia and carbon dioxide in the approximate ratio of 3.2 to 1 and containing about 1.6 lbs. $NH_3$/gal. and about 1.3 lbs. $CO_2$/gal., is fed from mother liquor storage tank 9 by way of valved conduit 10 and branch pipes 11a, 11b and 11c, to a plurality of spaced levels in the upper part of the absorption column 2. In this specific installation mother liquor is fed to the column at the approximate rate of 10 gallons per minute.

Stack gas, containing approximately 22.5% carbon dioxide, the remainder mostly nitrogen with some residual free oxygen, is passed, by way of gas conduit 12, into and countercurrently through absorption column 2. In its passage through the column the carbon dioxide content of the stack gas largely is absorbed by the repeatedly contacted circulating liquor, and the waste (residual) gas is vented to atmosphere through vent pipe 13. In this specific installation, the volume of stack gas passed through absorption column 2 is adjusted to provide 12 pounds of $CO_2$ per minute to the circulating liquor.

The build-up in the body of circulating liquor in the circuit 1, 2, 3, 4, occasioned by the addition of mother liquor thereto, is compensated for by withdrawing a similar volume (i. e., approximately 10 gals./min.) of circulating liquor from the circuit: for this purpose there is provided a branch conduit means 14 including a metering valve 15, which branch conduit means communicates between the conduit 5 of the aforesaid closed circuit system and a closed mixing tank 16. The latter desirably may be equipped with a motor-driven stirrer 17 for mixing the contents thereof. Preferably, the conditions of the operation are so adjusted that the withdrawn circulating liquor contains about 1.5 lbs. $NH_3$/gal. and about 2.4 lbs. $CO_2$/gal., the ammonia to carbon dioxide mol ratio being approximately 1.7 to 1.0.

Mother liquor from storage tank 9 is delivered by way of valved conduit 18 to mixing tank 16 wherein it is mixed with circulating liquor delivered thereto, from the aforesaid closed circuit system, by branch conduit means 14. In the present installation, mother liquor in the amount of 10 gals./min. is admixed with the withdrawn circulating liquor in the amount of 10 gals./min. The resulting liquid mixture is eventually diverted to a standard ammonia absorber 19, by way of conduit 20, in which ammonia absorber the liquid is contacted with gaseous ammonia, fed to the absorber by valved conduit 21, and the ammoniated liquid (i. e., the desired leaching solution) is withdrawn to a point of storage or use by way of valved conduit 22.

The system above described makes it possible to maintain a concentration of $NH_3$ and $CO_2$ in the circulating liquor much different from that of the mother liquor and such that practically no—or only a very small amount—of the ammonia content of the mother liquor is carried off or lost in the vented gaseous residuum of the stack gas.

The ratio of $NH_3$ to $CO_2$ can be controlled by the relative amount of mother liquor added to the closed circuit system: the less mother liquor added—to a unit volume of circulating liquor—the lower the $NH_3$-to-$CO_2$ ratio in the circulating liquor, and vice versa.

Regulation of the amount of mother liquor so added effects control not only of the ratio of $NH_3$ to $CO_2$, as aforesaid, but also the concentration of these latter in the circulating liquor. For example, in Fig. 2 the composition of the above-chosen mother liquor is shown at point M and the composition of the circulating liquor is shown at point "X," which latter represents a concentration of approximately 8.8 mols $NH_3$/liter. Point Y represents an ammonia concentration of approximately 6 mols $NH_3$/liter. If less and less mother liquor be added than the 10 gallons per minute of the above specific example, the flow of stack gas containing $CO_2$ remaining constant, poorly soluble ammonium bicarbonate—$(NH_4)HCO_3$—will be crystallized out (precipitated) in larger and larger amounts and the concentrations of $NH_3$ and $CO_2$ in the liquid phase of the circulating liquor will decrease. The precipitated ammonium bicarbonate would be inert as far as absorption of $CO_2$ is concerned.

The circulating liquor in absorption column 2 becomes quite thick with ammonium bicarbonate crystals as point Y on the triangular diagram, Fig. 2, is reached. Accordingly, it may be desirable so to conduct the operation as to maintain the composition of the circulating liquor at X or at a point, along line X—Y, intermediate X and Y where crystal occurrence is not bothersome. Thus, at point X very little if any crystals are present. Nevertheless, it is feasible so to conduct the operation as to maintain the concentration shown at point Y and, if necessary or expedient in the interest of maintaining a very low concentration of $NH_3$ in the circulating liquor, to remove some or all of the crystals from the circulating liquor—as by centrifuging, filtering, thickening or other known expedient—and to transfer the removed ammonium bicarbonate crystals to the mixing tank 16. As will be understood from a consideration of the triangular diagram, addition of mother liquor to the crystals results in converting the ammonium bicarbonate to the more soluble ammonium carbonate.

By the procedure above described it is readily possible to increase the $CO_2$ concentration of the mother liquor to more than 5 gram mols/liter without losing more than an inconsequentially small amount of the $NH_3$ content of the mother liquor. As an amount of the circulating liquor becomes mingled—at any one level of the absorption column—with a very small amount of mother liquor the ammonia concentration of the mixture is correspondingly raised and there would be a tendency to release gaseous ammonia were it not for the fact that the carbon dioxide concentration of the circulating liquor simultaneously has become increased—by adsorption of carbon dioxide from the contacted stack gas—whereby to maintain the desired $NH_3/CO_2$ ratio within desired limits.

The extent to which the mixture of withdrawn circulating liquor and added mother liquor is ammoniated is a matter of choice, being largely determined by the desired ammonia concentration of the resulting leaching solution.

It is to be understood that the above specific example is illustrative but not exhaustive of the process of the present invention. Thus, it is a matter of indifference precisely at what point in the system the circulating liquor is withdrawn from the system for admixture with mother liquor as such. If the ammonia concentration of the mixture of withdrawn circulating liquor and mother liquor is sufficiently high for the purpose intended, there will of course be no need for a subsequent ammoniating step. If the withdrawn circulating liquor is, per se, the desired product the mixing of same with mother liquor will be omitted. While the precise $NH_3/CO_2$ ratio of 1.65 to 1 recited hereinbefore is the preferred ratio, the same may be modified within reasonable limits.

We claim:

1. Process which comprises establishing a first aqueous solution of ammonia and carbon dioxide in which the mol ratio of ammonia to carbon dioxide is approximately 1.7 to 1 and the concentration of ammonia is at least 6 mols/liter, passing the first solution in absorbing contact with a gas mixture containing a substantial but minor amount of carbon dioxide, whereby to increase the carbon dioxide content of said first solution and simultaneously introducing into the first solution a second aqueous solution of ammonia and carbon dioxide, in which second solution the mol ratio of ammonia to carbon dioxide is materially greater than 1.7 to 1 and the concentration of ammonia is at least 10 mols/liter, under such conditions as to maintain the mol ratio of ammonia to carbon dioxide in the resulting mixture at about 1.7 to 1.

2. Process which comprises establishing a first aqueous solution of ammonia and carbon dioxide in which the mol ratio of ammonia to carbon dioxide is approximately 1.7 to 1 and the concentration of ammonia is at least 6 mols/liter passing the first solution in absorbing contact with a gas mixture containing a substantial but minor amount of carbon dioxide, whereby to increase the carbon dioxide content of said first solution, simultaneously introducing into the first solution a second aqueous solution of ammonia and carbon dioxide, in which second solution the mol ratio of ammonia to carbon dioxide is materially greater than 1.7 to 1 and the concentration of ammonia is at least 10 mols/liter under such conditions as to maintain the mol ratio of ammonia to carbon dioxide in the resulting mixture at about 1.7 to 1, and admixing the resulting mixture with a further portion of said second aqueous solution.

3. Process which comprises establishing a first aqueous solution of ammonia and carbon dioxide in which the mol ratio of ammonia to carbon dioxide is approximately 1.7 to 1 and the concentration of ammonia is at least 6 mols/liter, passing the first solution in absorbing contact with a gas mixture containing a substantial but minor amount of carbon dioxide, whereby to increase the carbon dioxide content of said first solution, simultaneously introducing into the first solution a second aqueous solution of ammonia and carbon dioxide, in which second solution the mol ratio of ammonia to carbon dioxide is materially greater than 1.7 to 1 and the concentration of ammonia is at least 10 mols/liter, under such conditions as to maintain the mol rate of ammonia to carbon dioxide in the resulting mixture at about 1.7 to 1, admixing the resulting mixture with a further portion of said second aqueous solution, and ammoniating the mixture.

4. Process which comprises continuously circulating in a closed circuit an aqueous circulating liquor consisting essentially of a solution of ammonia and carbon dioxide in which the mol ratio of ammonia to carbon dioxide is not materially higher than 1.7 to 1 and the concentration of ammonia is at least 6 mols/liter, passing a gas mixture containing a substantial but minor amount of carbon dioxide through the circulating liquor to increase the carbon dioxide content thereof and simultaneously introducing into the circulating liquor an aqueous mother liquor consisting essentially of a solution of ammonia and carbon dioxide in which mother liquor the mol ratio of ammonia to carbon dioxide is materially greater than 1.7 to 1 and the concentration of ammonia is at least 10 mols/liter, at a rate sufficient to maintain substantially constant the mol ratio of ammonia to carbon dioxide in the circulating liquor, and bleeding off circulating liquor from the closed circuit at a rate substantially equal to the rate of introduction of said mother liquor thereinto whereby to maintain substantially constant the volume of circulating liquor in the closed circuit.

5. Process as defined in claim 4, in which the composition of the circulating liquor is, during the carrying out of the process, maintained within the limits of line X—Y of Fig. 2 of the accompanying drawing.

6. Process which comprises continuously circulating in a closed circuit an aqueous circulating liquor consisting essentially of a solution of ammonia and carbon dioxide in which the mol ratio of ammonia to carbon dioxide is not materially higher than 1.7 to 1 and the concentration of ammonia is at least 6 mols/liter, passing a gas mixture containing a substantial but minor amount of carbon dioxide through the circulating liquor to increase the carbon dioxide content thereof and simultaneously introducing into the circulating liquor an aqueous mother liquor consisting essentially of a solution of ammonia and carbon dioxide, in which mother liquor the mol ratio of ammonia to carbon dioxide is materially greater than 1.7 to 1 and the concentration of ammonia is at least 10 mols/liter, at a rate sufficient to maintain substantially constant the mol ratio of ammonia to carbon dioxide in the circulating liquor, bleeding off circulating liquor from the closed circuit at a rate substantially equal to the rate of introduction of said mother liquor thereinto whereby to maintain substantially constant the volume of circulating liquor in the closed circuit, and admixing the bled-off circulating solution with a further portion of said mother liquor.

7. Process as defined in claim 6, in which ammonium bicarbonate in solid phase is separated from the circulating liquor and is added to a further portion of mother liquor.

8. Process which comprises continuously circulating in a closed circuit an aqueous circulating liquor consisting essentially of a solution of ammonia and carbon dioxide in which the mol ratio of ammonia to carbon dioxide is not materially higher than 1.7 to 1 and the concentration of ammonia is at least 6 mols/liter, passing a gas mixture containing a substantial but minor amount of carbon dioxide through the circulating liquor to increase the carbon dioxide content thereof and simultaneously introducing into the circulating liquor an aqueous mother liquor consisting essentially of a solution of ammonia and carbon dioxide, in which mother liquor the mol ratio of ammonia to carbon dioxide is materially greater than 1.7 to 1 and the concentration of ammonia is at least 10 mols/liter, at a rate sufficient to maintain substantially constant the mol ratio of ammonia to carbon dioxide in the circulating liquor, bleeding off circulating liquor from the closed circuit at a rate substantially equal to the rate of introduction of said mother liquor thereinto whereby to maintain substantially constant the volume of circulating liquor in the closed circuit, admixing the bled-off circulating solution with a further portion of said mother liquor, and ammoniating the resulting mixture.

9. Process which comprises continuously circulating in a closed circuit an aqueous circulating liquor consisting essentially of a solution of ammonia and carbon dioxide in which the mol ratio of ammonia to carbon dioxide is approximately 1.7 to 1 and the concentration of ammonia is at least 6 mols/liter, protractedly contacting the circulating liquor with a stack gas containing a substantial but minor proportion of carbon dioxide while introducing into the former in relatively small amounts at a time an aqueous mother liquor consisting essentially of a solution of ammonia and carbon dioxide, in which mother liquor the mol ratio of ammonia to carbon dioxide is materially greater than 1.7 to 1 and the concentration of ammonia is at least 10 mols/liter, under conditions to maintain substantially constant the mol ratio of ammonia to carbon dioxide in the circulating liquor, bleeding off circulating liquor from the closed circuit at a rate substantially equal to the rate of introduction of said mother liquor thereinto whereby to maintain substantially constant the volume of circulating liquor in the closed circuit, admixing the bled-off circulating liquor with a further portion of said mother liquor, and ammoniating the resulting mixture.

10. Process of converting into a strongly ammoniacal aqueous solution of ammonium carbamate an aqueous mother liquor consisting essentially of a solution of ammonia and carbon dioxide, the mol ratio of ammonia to carbon dioxide in said mother liquor being in excess of 3 to 1 and the concentration of ammonia being at least 10 mols/liter, which comprises establishing an aqueous circulating liquor consisting essentially of a solution of ammonia and carbon dioxide in which the mol ratio of ammonia to carbon dioxide is of the order of 1.7 to 1 and the ammonia concentration is at least 6 mols/liter, circulating said aqueous circulating liquor in closed circuit, passing through the circulating solution a gas mixture containing a substantial but minor amount of carbon dioxide, whereby to increase the carbon dioxide content of said circulating liquor while simultaneously introducing said mother liquor into the latter in relatively small amount at a time under conditions to maintain substantially constant the mol ratio of ammonia to carbon dioxide in the circulating liquor, bleeding off circulating liquor from the closed circuit at a rate substantially equal to the rate of introduction of said mother liquor whereby to maintain substantially constant the volume of circulating liquor in the closed circuit, admixing the bled-off circulating liquor with a further portion of said mother liquor, and absorbing ammonia gas in the resulting admixture.

11. The process defined in claim 10, in which the aqueous mother liquor contains approximately 1.6 pounds/gal. of ammonia and approximately 1.3 pounds/gal. of carbon dioxide, the bled-off circulating liquor contains approximately 1.5 pounds/gal. of ammonia and approximately 2.4 pounds/gal. of carbon dioxide, and the bled-off circulating liquor and the further portion of mother liquor are admixed in substantially the proportions to yield an aqueous solution consisting essentially of about 1.6 pounds/gal. of ammonia and about 1.8 pounds/gal. of carbon dioxide.

12. Process of carbonating an aqueous solution of $NH_3$ and $CO_2$, in which solution the $NH_3$ to $CO_2$ ratio is at least about 3 to 1 and the $NH_3$ concentration is at least 10 mols/liter, by means of a gas mixture containing $CO_2$ in substantial but minor amount without substantial loss of $NH_3$ in the $CO_2$-denuded gas mixture, which comprises contacting the gas mixture with the aqueous solution in admixture with a substantial excess of a second aqueous solution of $NH_3$ and $CO_2$, in which second solution the $NH_3$ to $CO_2$ ratio is not materially higher than 1.7 to 1.0 and the $NH_3$ concentration is at least 6 mols/liter but not materially greater than 8.8 mols/liter.

References Cited in the file of this patent

UNITED STATES PATENTS

| Number | Name | Date |
| --- | --- | --- |
| 1,014,868 | Gadomsky | Jan. 16, 1912 |
| 2,621,107 | Dean et al. | Dec. 9, 1952 |

OTHER REFERENCES

Chem. Soc. Journal, vol. 8–1870, pp. 215–217, 273–4. (Copy in Sci. Lib.)